United States Patent
Singh et al.

(10) Patent No.: US 10,364,892 B2
(45) Date of Patent: Jul. 30, 2019

(54) KERROS OR LAYERED NON-CONDUCTIVE RINGED SEALING PANCAKE GASKET ASSEMBLY

(71) Applicant: AOI (Advanced Oilfield Innovations, Inc.), Stafford, TX (US)

(72) Inventors: Ranjit K. Singh, Houston, TX (US); Daniel Maurice Lerner, Missouri City, TX (US); Andrew Lerner, Houston, TX (US); Andre Orban, Sugar Land, TX (US)

(73) Assignee: AOI (Advanced Oilfield Innovations, Inc.), Stafford, TX (US)

( * ) Notice: Subject to any disclaimer, the term of this patent is extended or adjusted under 35 U.S.C. 154(b) by 148 days.

(21) Appl. No.: 15/322,656

(22) PCT Filed: Jun. 26, 2015

(86) PCT No.: PCT/US2015/038052
§ 371 (c)(1),
(2) Date: Dec. 28, 2016

(87) PCT Pub. No.: WO2016/003815
PCT Pub. Date: Jan. 7, 2016

(65) Prior Publication Data
US 2017/0146127 A1    May 25, 2017

Related U.S. Application Data

(60) Provisional application No. 62/019,143, filed on Jun. 30, 2014.

(51) Int. Cl.
| F16J 15/12 | (2006.01) |
| F16L 15/00 | (2006.01) |
| F16J 15/10 | (2006.01) |

(52) U.S. Cl.
CPC ........... *F16J 15/122* (2013.01); *F16J 15/102* (2013.01); *F16J 15/106* (2013.01); *F16J 15/108* (2013.01); *F16L 15/003* (2013.01)

(58) Field of Classification Search
CPC ........ F16J 15/122; F16J 15/102; F16J 15/106; F16J 15/108; F16L 15/003; F16L 15/008;
(Continued)

(56) References Cited

U.S. PATENT DOCUMENTS

| 3,124,502 A * | 3/1964 | Radke ................ F16J 15/20 |
| | | 277/536 |
| 3,243,956 A * | 4/1966 | Hamm ................ F02K 9/34 |
| | | 102/290 |

(Continued)

FOREIGN PATENT DOCUMENTS

WO    2012045698 A1    4/2012

*Primary Examiner* — Nathan Cumar
(74) *Attorney, Agent, or Firm* — ePatentManager; Guerry L. Grune

(57) ABSTRACT

A non-conductive multi-layered ringed sealing gasket for mating pipe joints along a piping assembly comprising at least two mutually joined ring-shaped bodies. The ringed sealing gasket can be comprised of a metal and the bottom gasket section is separated from the top gasket section by an inner portion that is comprised of one or more non-conductive materials that are ductile but do not flow during dynamic motion and forces associated with the motion of the pipe joints wherein at least one layer of the inner portion includes rings with toroidal wrapped fibers having voids filled with adhesives such that shear forces occurring during movement of the piping assembly are distributed predominantly in the tensile direction along the axial length of the fibers, thereby eliminating cracking of the gasket under excessive loads.

60 Claims, 8 Drawing Sheets

(58) Field of Classification Search
CPC ....... F16L 5/02; F16L 5/10; F16L 7/02; F16L 17/02; F16L 19/0218; F16L 19/12; F16L 25/01
USPC .......................................................... 277/314
See application file for complete search history.

(56) References Cited

U.S. PATENT DOCUMENTS

| | | | |
|---|---|---|---|
| 3,372,948 A | | 3/1968 | Arneson |
| 3,383,560 A | | 5/1968 | Ginsburgh |
| 3,383,883 A | | 5/1968 | Dutaret |
| 3,441,293 A | | 4/1969 | Bagnulo |
| 3,555,667 A | * | 1/1971 | Carlson ................... F16L 25/01 228/164 |
| 3,873,105 A | | 3/1975 | Wehner |
| 4,142,833 A | * | 3/1979 | Rybicki ................... B64C 27/35 384/221 |
| 4,191,389 A | | 3/1980 | Jelinek |
| 4,595,218 A | | 6/1986 | Carr et al. |
| 4,776,600 A | | 10/1988 | Kohn |
| 5,141,448 A | | 8/1992 | Mattingly et al. |
| 5,172,920 A | * | 12/1992 | Schlenk ................. F16J 15/122 277/592 |
| 5,431,417 A | | 7/1995 | Dahlgren |
| 5,440,917 A | | 8/1995 | Smith et al. |
| 6,402,159 B1 | | 6/2002 | Kohn |
| 7,321,107 B2 | | 1/2008 | Yagnik et al. |
| 7,690,698 B1 | | 4/2010 | Curran |
| 2004/0118455 A1 | * | 6/2004 | Welty ................... F16K 3/0236 137/375 |
| 2013/0134707 A1 | | 5/2013 | Seryl et al. |
| 2013/0186669 A1 | | 7/2013 | Chabas et al. |

* cited by examiner

KERROS OR LAYERED NON-CONDUCTIVE RINGED SEALING PANCAKE GASKET ASSEMBLY

PRIORITY

This application is a National Phase filing under 35 USC 371 of and claims priority to PCT International application number PCT/US2015/038052, filed Jun. 26, 2015 entitled "Kerros Non-Conductive Ringed Sealing Pancake Gasket Assembly", which claims priority under 35 USC 119(e) from Provisional Application No. 62/ 019,143 entitled "Kerros or Layered Non-Conductive Ringed Sealing Pancake Gasket Assembly" filed Jun. 30, 2014.

FIELD OF INVENTION

This invention relates generally to an assembled ring shaped device and method of assembling this device which acts to join, seal, and provide an electrically non-conductive section located between two portions of a piping assembly. The word "kerros" is derived from the Finnish word for a ring and more specifically for a layered ring. In this instance, the layered non-conductive ringed gasket sealing assembly is used in jointed piping assemblies designed for drilling, measuring, completion, and production tubing in hydrocarbon producing wells that cannot tolerate either electrical continuity or fluid leakage. The ringed sealing gasket must be capable of withstanding high tensile and compressive pressures applied both from the exterior and the interior of the two sections of the joint.

BACKGROUND

The requirements for using several known types of seal rings for conduit joints that function in high pressure environments are well known. Common to all of these is the fact that they are made of compact and non-compressible material like metal and metal alloys because other types of materials do not meet all of the requirements in tensile or compressive strength properties and therefore will not be as strong as required in the high pressure applications. One disadvantage of using such conventional seal rings and/or gaskets and/or washers, is the fact that the joints in the pipeline typically are exposed to thermal work in the material as well as mechanical stress forces resulting in a joint especially during bending of the piping assembly, which after some time will cause the joint to leak. Furthermore, when connecting these types of joints with these rings and/or gaskets, the conventional types normally provide little flexibility and if so, in one direction only. The conventional ringed gaskets are normally constructed of a single layered, single material. In some cases, ceramics are used when known compressive forces exceed 30,000 psi. If the ceramic ringed sealing gasket is stressed under certain severe conditions, it may stress crack leading to catastrophic failure in that the ringed gasket will not be able to provide either continued insulation between the two sections of the joint and/or sufficient sealing capacity. In a subassembly used for example, in servicing hydrocarbon producing wells, there is an additional need to provide gaskets which are insulators that will fail if conduction through the joint occurs.

One purpose of the present invention is to provide a non-conductive ringed sealing gasket, referred to herein as a "kerros" gasket (layered), that avoids the aforementioned problems in connection with;

(a) thermal work in the material in the area around the conduit joints,
(b) withstanding full loading wherein at least one layer includes the inner portion with continuous toroidal axially and radially wrapped polyamide fibers having voids filled with ceramic-filled epoxies such that shear forces occurring during movement of the piping assemblies are distributed predominantly radially along the axial length of the polyamide fibers, thereby forcing the fibers to distribute load in the tensile direction and eliminating cracking of the gasket.

The present invention is directed to joints such as those formed between carriers and their respective bores and the provision of sealing rings for such joints, wherein the sealing rings and adjacent joint surfaces are so configured that the integrity of the fluid tight joint formed thereby is maintained under pressure and remains "leak-proof" either within the joint or exterior to the joint. At the same time, the joints should maintain their self-aligning characteristic as they are put into motion, causing excessive torsional, tensile, compressive, and shear forces that often exceed 100,000 psi when the piping joints are placed in downhole applications. The failures in a gap subassembly often occur in directional drilling when the drilling begins to stray from a vertical direction toward a horizontal direction. In order to dampen and/or alleviate the ultimate load failures, it is desirable to use a gasket (acting as a spacer and/or washer) between any jointed piping assembly that is in motion in order to lengthen the time between failures or even to eliminate failures occurring in the joint. By using one or more gaskets, it is possible to add flexural tolerance to a piping assembly. The gap sub assembly used in gas and oil downhole rigs is one example where such an application is useful and is becoming more and more demanded as the industry evolves toward horizontal drilling and fracing.

SUMMARY

The present invention includes a non-conductive ringed sealing gasket device, a method of assembling the device and a method of using the device. The device is herewith referred to as a kerros (layered) gasket for the reasons given above. The layered gasket allows for making at least a two-sectioned piping assembly which is connected by a joint utilizing the device. The gasket, of course, also acts as a spacer and/or washer within the joint between the at least two two-sectioned piping assembly. The device and method of using the device provides improved performance when the piping assembly is required to become configured in "doglegs" or other curved geometries (as opposed to "straight-line" designs). In either vertical or horizontal (downhole or above ground) applications, the device can also improve or even eliminate galvanic corrosion between the at least two piping sections of the piping assembly. The kerros gasket also must provide electrical isolation layers, coatings, or surface treatments of conductive metals causing metal oxides, so that a flange (for instance) used to connect the two or more sections of the piping assembly are electrically isolated. The mechanical requirements are that the kerros gasket must also improve the tolerance of dynamic stresses of the piping assembly in comparison with, for example, a simpler gasket using only ceramics. These stresses become excessive and destructive during movement of the piping assembly in a non-vertical or non-horizontal manner. In this way, the gasket provides some dampening and/or cushioning within the joint so that the piping assembly can still have the durability to function as if it were a single assembly.

Therefore, a general object of the present invention is to provide a non-conductive multi-layered ringed sealing gasket for mating one or more pipe joints along one or more piping assemblies comprising:

at least two mutually joined ring-shaped bodies, the bodies each having a top surface portion, a top gasket section bonded with, adhered to, or part of the top surface portion, a bottom surface portion, and a bottom gasket section bonded with, adhered to, or part of the bottom surface portion wherein the bottom surface portion of one of the bodies is mated to a top surface portion of another of the bodies forming multi-layers;

whereby;

the at least two mutually joined ringed-shaped bodies in combination comprise a sealing ring, so that the top and bottom gasket section along with the top and bottom surface portion have equal dimensioned outer diameters with a total thickness no greater than the diameter of the piping assembly in each pipe-joint half mated by the gasket;

and wherein the top and bottom gasket section of the ringed sealing gasket are comprised of a metal and wherein the top and bottom gasket section is separated by an inner portion that is comprised of one or more non-conductive materials wherein the non-conductive materials are in combination with a top and bottom surface of the inner portion are ductile but do not flow during dynamic motion and forces associated with the motion of the one or more pipe joints;

and wherein the sealing ring is thus adapted for pressure-tight joining of pipe elements and exhibits full metal ductility withstanding compressive, tensile, shear and/or torsional forces greater than or equal to that of the dynamic compressive, tensile, shear and/or torsional strength of one or more pipe joints.

The at least one layer includes an inner portion with continuous toroidal axially and radially wrapped fibers having voids filled with adhesives such that shear forces occurring during movement of the piping assemblies are distributed predominantly radially along the axial length of the fibers, thereby forcing the fibers to distribute load in the tensile direction and eliminating cracking of the gasket either before during or after the gasket has been under load or exposed to cyclical loads.

As stated, the at least one layer includes an inner portion that is wrapped with a toroidal pattern with a prepreg or fabric filled with adhesives, wherein the adhesives are epoxies, and wherein the prepeg is manufactured from the group consisting of fibers or films of polyamides, polyimides, polyamideimides, polybenzimidizoles, polyesters, fiberglass and/or biopolymers.

The epoxies may be filled with at least one of the group consisting of: fibers, films, or particles of; ceramics, ceramers, tungsten carbide, silicon carbide, silica including silane bonding agents, silicone polymers, E-glass, polybenzimidizoles, polyetheretherketones, polysulfones, polyetherimides, and fluoropolymers.

The at least one layer includes an inner portion with a cigarette wrapped film or fiber (often using a polyamide) having voids filled with filled epoxies.

In further embodiments the least one layer exists within the inner portion which is covered but not wrapped around with a woven or non-woven polymeric cloth having voids either pre-filled or post-filled with the epoxies.

The at least one layer exists within an inner portion that is covered by filament wound polyamide fibers having voids either pre-filled or post-filled with epoxies. The polyamide could be Kevlar®, a trademarked product of DuPont De Nemours, Inc.

In further embodiments the inner portion comprises a single non-conductive homogenous material layer and/or a non-conductive non-homogenous material layer, a single conductive homogenous material layer, and/or a single conductive non-homogenous material layer.

The gasket has a total thickness that is no greater than the diameter of a sealing groove in each half pipe-joint creating a full joint when mated by the gasket, wherein the sealing groove is located between two sections of the piping assembly.

In another embodiment, the top and bottom gasket section and inner portion of the gasket are comprised of one or more non-conductive inorganic materials and/or organic materials.

It is also possible that the top and bottom gasket section is configured such that the outer dimensions of at least the top and bottom surface portion exceeds that of the inner portion of the gasket. Additionally, the top and bottom gasket section is beveled along at least one outer edge of the top and/or bottom gasket section. Here it is important that the top and bottom gasket section are compressed toward each other; both upon mating with and insertion within at least two sections of the piping assembly while the piping assembly is either at rest or in motion.

In yet a further embodiment, the non-conductive materials are anodized metal oxide(s) formed from a metal or metal alloy, the anodization of which can be established by treating the top and bottom surface metal portion of the gasket.

The anodized metal oxide(s) may be formed by anodized spraying, plasma etching, and/or oxidation exposure techniques for the top and bottom metal gasket sections. The non-conductive materials may also comprise one or more layers of a ceramic or an inorganic composite material such as a ceramer and the inner portion may be comprised of only insulated metal rings.

It is further possible that the sealing ring with the top and bottom gasket section along with the top and bottom surface portion includes at least one diameter having dimensions greater than the inner portion of the sealing ring.

Another embodiment of the multi-layered ringed sealing gasket for mating one or more pipe joints along one or more piping assemblies comprises the top and bottom gasket section of the ringed sealing gasket being manufactured from a non-metal such as a ceramic or ceramer top and bottom section wherein the top and bottom gasket section remain separated by an inner portion that is comprised of one or more non-conductive materials.

Another embodiment of the multi-layered ringed sealing gasket for mating one or more pipe joints along one or more piping assemblies comprises a top and bottom gasket section that is separated by an inner portion that is comprised of one or more layers which are interlayered with conductive materials wherein the conductive materials are in combination with a top and bottom surface of the inner portion that remains ductile but does not flow during dynamic motion and forces associated with the motion of one or more pipe joints.

BRIEF DESCRIPTION OF THE DRAWINGS

The present invention has other objects, features and advantages which will become more clearly apparent in connection with the following detailed description of embodiments, taken in conjunction with the appended drawings in which:

FIGS. 5, 6, and 7, are all cross-sectional isometric views of individual elements which combined have all the elements shown in FIG. 4 thereby arriving at a finished non-conductive ringed pancake sealing gasket.

DETAILED DESCRIPTION

Figure 1:
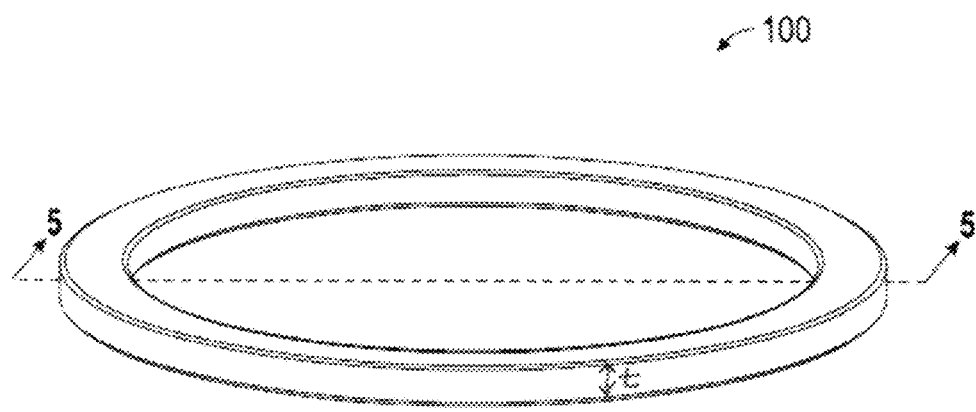
FIG. 1 is an isometric projection or view of one ring or one layer which is part or all of an inner portion of a non-conductive ringed pancake sealing gasket manufactured for withstanding high compressive loads using a single non-conductive material such as a ceramic or ceramer.

As described in the summary above, the present disclosure provides for a non-conductive ringed sealing gasket device, a method of assembling the device and a method of using the device. The device is herewith referred to as a kerros gasket for the reasons given above. The layered gasket allows for making at least a two-sectioned piping assembly which is connected by a joint utilizing the device. The gasket, of course, also acts as a spacer within the joint between the at least two two-sectioned piping assembly. The device and method of using the device provides improved performance when the piping assembly is required to become configured in "doglegs" or other curved geometries (as opposed to "straight-line" designs). In either vertical or horizontal (downhole or above ground) applications, the device can also improve or even eliminate galvanic corrosion between the at least two piping sections of the piping assembly. The kerros gasket also must provide electrical isolation layers, coatings, or surface treatments of conductive metals causing metal oxides, so that a flange (for instance) used to connect the two or more sections of the piping assembly are electrically isolated. The word "kerros" is derived from the Finnish word for a ring and more specifically for a layered ring. In this instance, the layered ringed gasket is primarily used in jointed piping assemblies that allow for drilling, measuring, completion, and production tubing in hydrocarbon producing wells. The layered structure of this kerros gasket and the method of making the assembled device acts to join two portions of the piping assembly. It is possible, however, to use the layered ring in essentially any piping assembly requiring two or more sections. The mechanical requirements are that the kerros gasket must also improve the tolerance of dynamic stresses of the piping assembly in comparison with, for example, a simpler gasket using only ceramics. These stresses become excessive and destructive during movement of the piping assembly in a non-vertical or non-horizontal manner.

In this way, the gasket provides some dampening and/or cushioning within the joint so that the piping assembly can still have the durability to function as if it were a single assembly. It is necessary to survive pressure on and within the piping assemblies, and maintaining insulative properties during the gasket's lifetime. The purpose of the layered ring is to provide additional protection to ensure electrical isolation between two piping sections while at least retaining mechanical strength and in most cases improving joint performance. Ideally, to accomplish this task, one would select a non-conductive metal which meets or exceeds the structural strength integrity of the metal piping. Joint performance using this specially designed kerros gasket is especially improved when the joint is being used for piping which is employed in either a static or dynamic manner that is not in a strictly vertical or horizontal spatial arrangement. The use of the structure of the present invention is substantially unlimited, being applicable wherever a conduit joint requires extremely high compressive and tensile strength so that torsion resulting in shear, compressive, and/or tensile failure cannot occur. This is particularly true in instances wherein the conduit joint may be subjected to high pressures —internally and/or externally.

Figure 5:
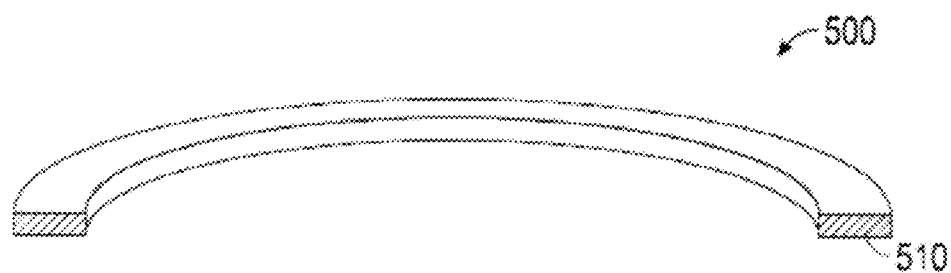
FIG. 5 is a cross-sectional isometric projection of either a top or bottom gasket sections having a top and bottom surface portion which could be comprised of either a conductive or non-conductive material and could be either homogeneous throughout or non-homogeneous.

Referring now initially to FIG. 1, shown is an isometric projection or view of one ring or one layer (100) which is part or all of an inner portion of a non-conductive ringed pancake sealing gasket manufactured for withstanding high compressive loads using a single non-conductive material such as a ceramic or ceramer. A total thickness (t) of the ring or layer (100) is less than equal or to the diameter of the sealing groove (5). A cross-sectional view of the same is as shown in FIG. 5.

Figure 2:
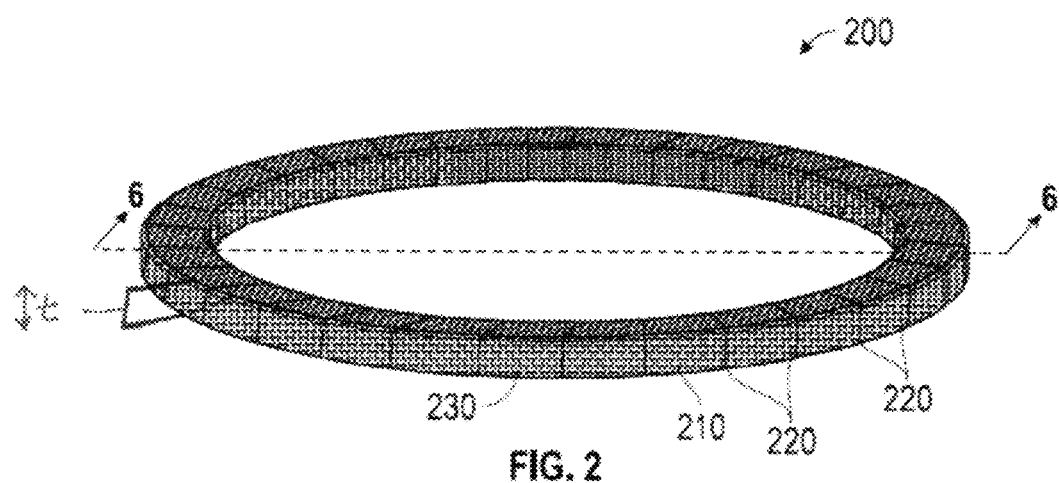
FIG. 2 is an isometric projection or view depicting one ring or one layer that is similar or identical to FIG. 1 which is part or all of the inner portion of the non-conductive ringed pancake sealing gasket manufactured for withstanding high compressive loads that is wrapped with a woven or non-woven fabric infused with adhesives that may or may not be filled adhesives.

Referring next to FIG. 2 which is an isometric projection or view (200) depicting one ring or one layer (230) that is similar or identical to FIG. 1. The single ring (230) is either conductive or a non-conductive material which is part of—or all of—the inner portion of the non-conductive ringed pancake sealing gasket manufactured for withstanding high compressive loads. Here, the ring (230) is shown wrapped with a woven or non-woven fabric (210) that may or may not be filled and/or infused with adhesives. The taped fabric (210) version shown is a tightly wrapped toroidal version with seams (220). The total thickness (t) of the ring or layer (230) is less than or equal to the diameter of the sealing groove (6). A cross-sectional version of FIG. 2 is depicted in FIG. 6.

Figure 3:
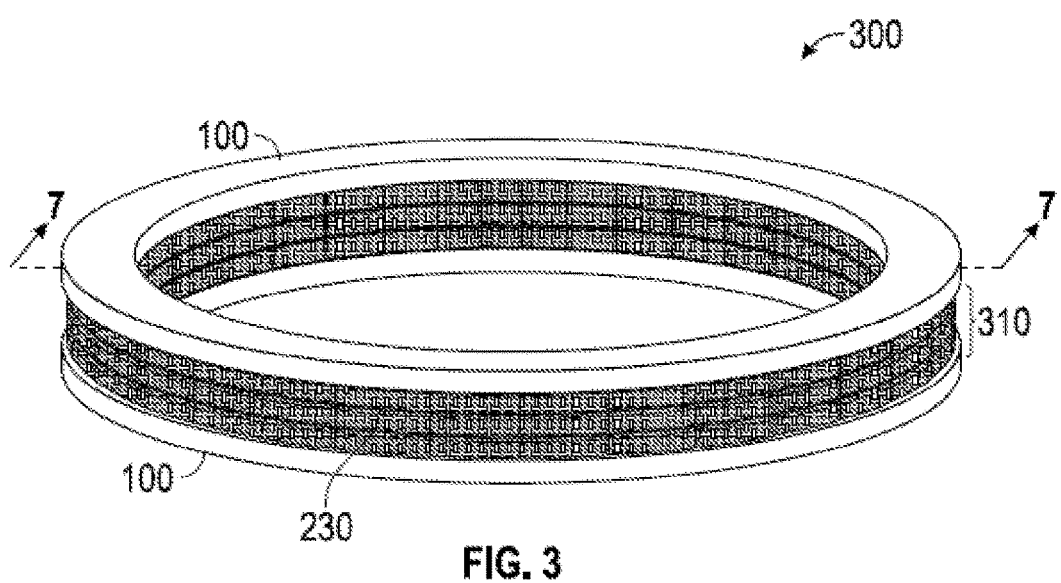
FIG. 3 is one embodiment of an isometric projection or view depicting three rings or three layers of similar or identical to the inner portion(s) shown in FIGS. 1 and 2 sandwiched between two outer rings or layers of the non-conductive ringed pancake sealing gasket manufactured for withstanding high compressive loads that is wrapped with a woven or non-woven fabric infused with adhesives that may or may not be filled adhesives. In this drawing, the outer rings or layers are shown as conductive metal rings or layers.

Now referring to FIG. 3, which is one embodiment of an isometric projection or view (300) depicting three rings or three layers which comprise an inner portion (310) similar or identical to the inner portion(s) shown in FIGS. 1 and 2. Each ring (230) has a construction similar to that shown in FIG. 2. In this manner, it is possible to use only and simply the ring (230) shown in FIG. 2 as the gasket of the present invention, if the single ring has full metal ductility as described above. The three rings (310) are sandwiched between two outer rings or layers (100) of the non-conductive ringed pancake sealing gasket manufactured for withstanding high compressive loads that is wrapped with a woven or non-woven fabric infused with adhesives that may or may not be filled adhesives. In this drawing, the outer rings or layers are shown as conductive metal rings or layers. The cross section al view of this assembly is shown in FIG. 7.

Figure 4:
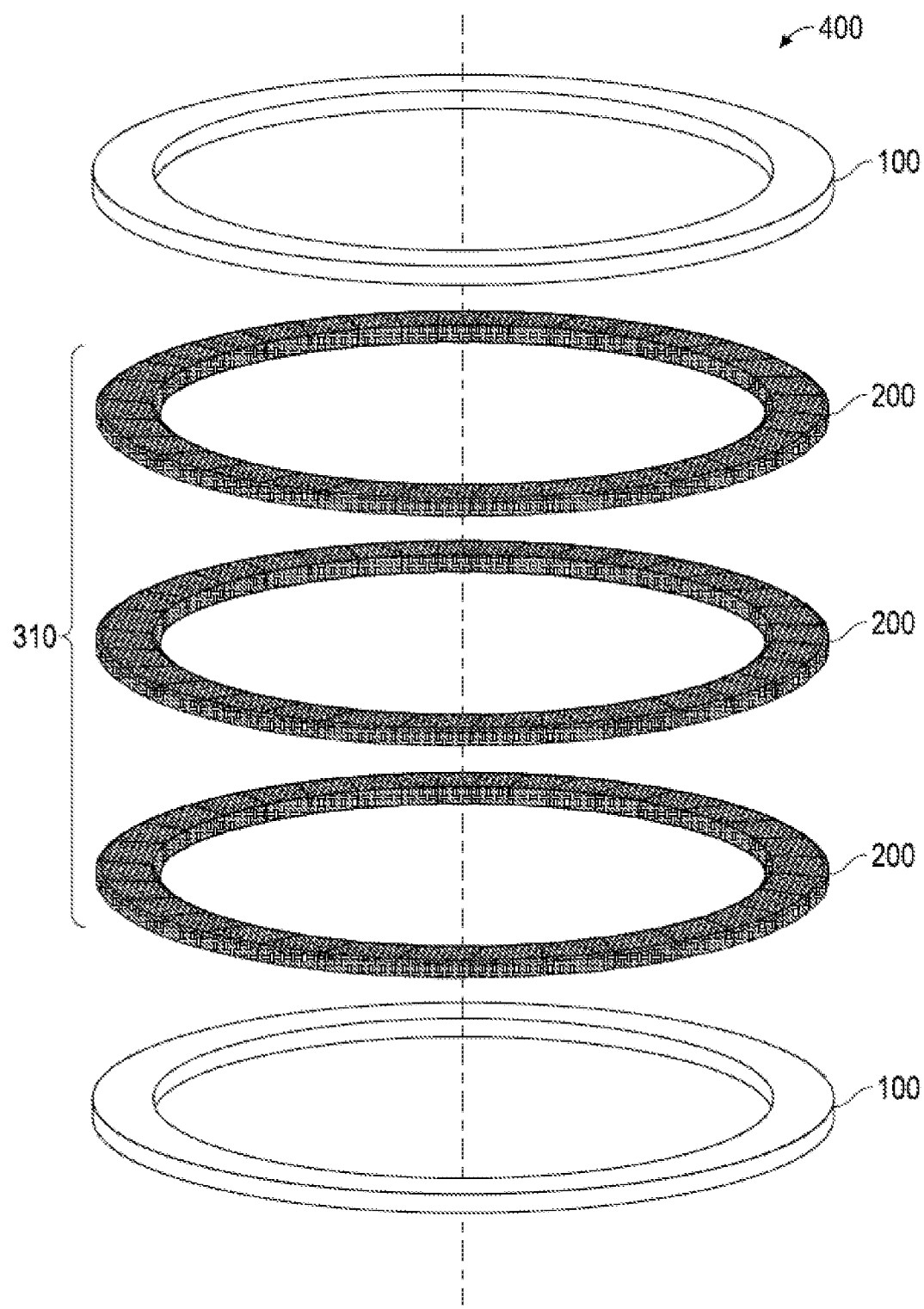
FIG. 4 is an exploded view of FIG. 3, indicating how both the top and bottom gasket sections (in this case conductive) have three (multi-layered) (in this case insulative) rings wrapped with adhesive infused fabric to complete the non-conductive ringed pancake sealing gasket which in completed form can withstand extreme compressive, shear, tensile and torsional loads applied by using piping assemblies used in downhole oil and gas completion and drilling applications.

Referring to FIG. 4, which is the same embodiment as shown in FIG. 3, an exploded view of FIG. 3 is shown with all the elements of one of the gaskets to be used in the needed application. These are the outer gasket sections (100), the three rings or layers (200) comprising the inner portion (310). The diagram indicates how both the top and bottom gasket sections (in this case conductive) have three (multi-layered) (in this case insulative) rings wrapped with adhesive infused fabric to complete a non-conductive ringed pancake (like stacked pancakes albeit it of different compositions) sealing gasket. In the completed form the gasket can withstand extreme compressive, shear, tensile and torsional loads applied by using piping assemblies used in downhole oil and gas completion and drilling applications.

Figure 6:
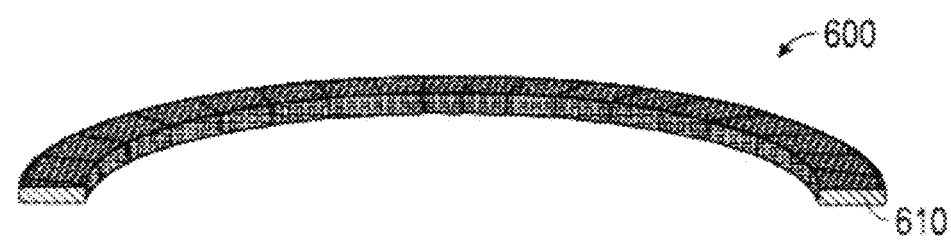
FIG. 6 is a cross-sectional isometric projection of the top and bottom gasket sections having a top and bottom surface portion covered with a fabric infused with adhesives non-conductive ringed pancake sealing gasket
Figure 7:
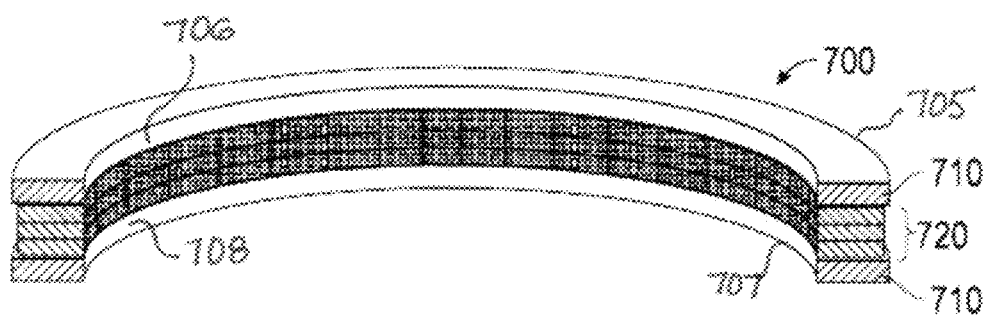
FIG. 7 is a cross-sectional isometric projection of the top and bottom gasket sections having five (5) mutually joined ring-shaped bodies each of the bodies having a top surface portion, a top gasket section bonded with, adhered to, or part of the top surface portion, a bottom surface portion, and a bottom gasket section bonded with, adhered to, or part of the bottom surface portion wherein the bottom surface portion of each of the bodies is mated to a top surface portion of another of the bodies forming multi-layers where the multi-layers comprise the inner portion of the non-conductive ringed pancake sealing gasket.

FIGS. 5, 6, and 7 are all cross-sectional isometric views of individual elements which combined have all the elements shown in FIG. 4 thereby arriving at a finished non-conductive ringed pancake sealing gasket. The cross sections (510), (610), and (710, 720) show homogenous ringed sections, but it is possible that the core of each of the rings shown in FIGS. 5, 6, and 7 could contain non-homogenous materials of construction as well. FIG. 7 provides a representation of a ringed gasket (sealing ring) (700) having a top gasket section (706) with a top surface portion (705), and a bottom gasket section (708) with a bottom surface portion (707).

Representative configurations of one or more sealing rings (100, 200, 300, 400) are provided.

Figure 8A:
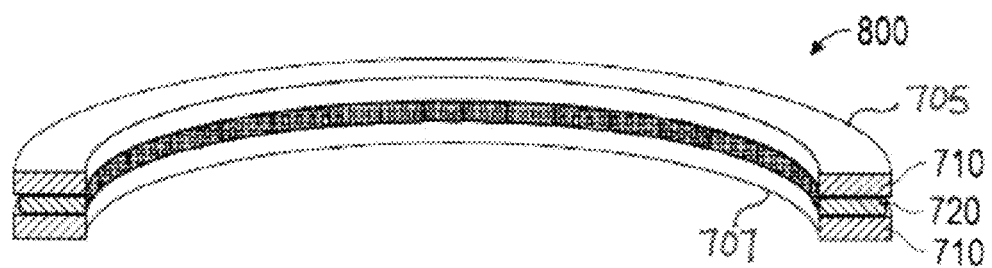
FIGS. 8A, B, and C are all cross-sectional isometric versions of FIG. 7, where the inner portion of the gasket comprises any number of multi-layers residing between a top and bottom gasket section bonded with, adhered to, or part of the bottom surface portion wherein the bottom surface portion of each of the bodies is mated to a top surface portion of another of the bodies with multi-layers where the multi-layers comprise the inner portion of the non-conductive ringed pancake sealing gasket.
Figure 8B:
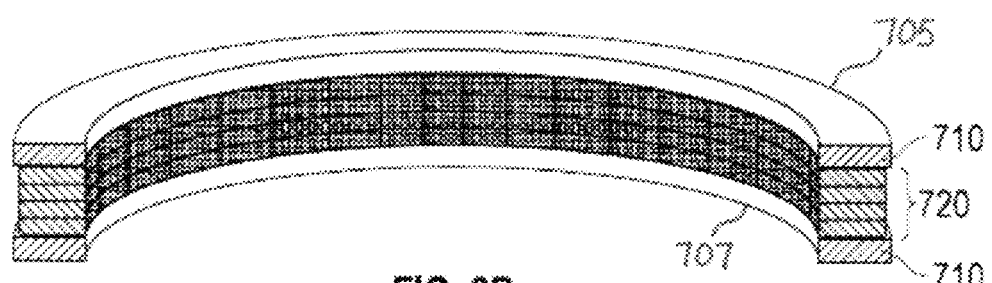
Figure 8C:
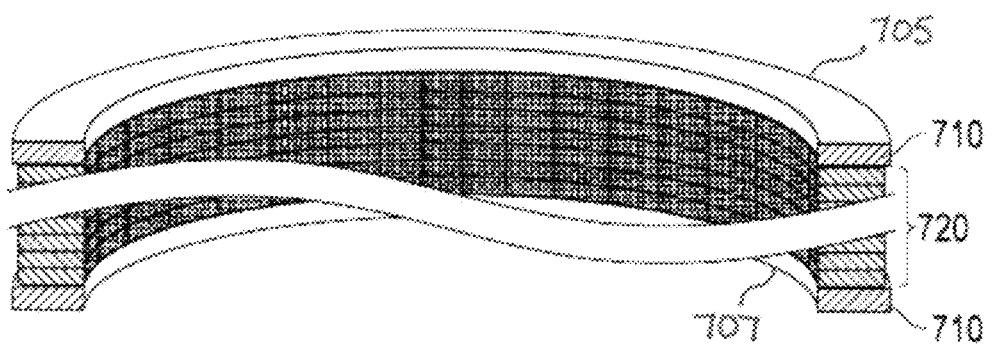

FIGS. 8A, 8B, and 8C are all cross-sectional isometric versions (800) of FIG. 7, where the inner portion of the gasket comprises any number of multi-layers (710, 720) residing between a top and bottom gasket section bonded with, adhered to, or part of the bottom surface portion wherein the bottom surface portion of each of the bodies is mated to a top surface portion of another of the bodies with multi-layers where the multi-layers comprise the inner portion of the non-conductive ringed pancake sealing gasket.

Figure 9:
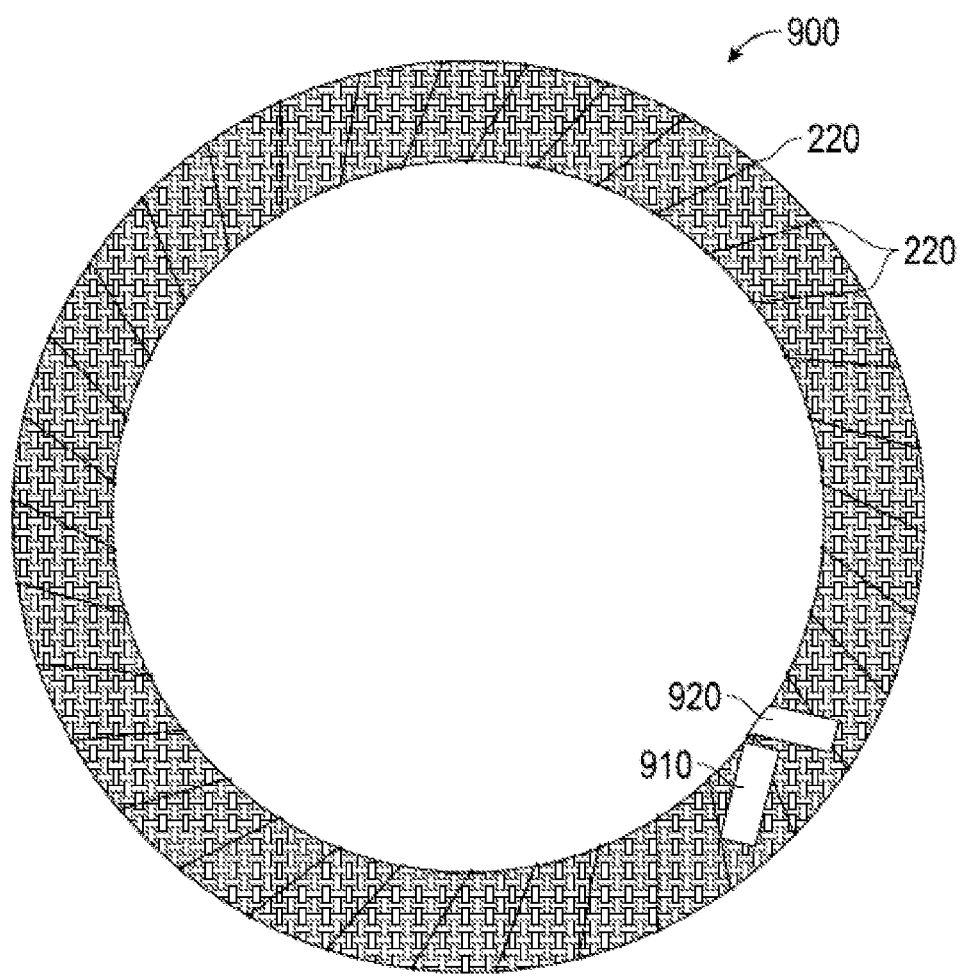
FIG. 9 is a schematic top view of FIG. 6, which illustrates an embodiment of the present invention using a toroidal wrapped fabric in the form of a tape with two smaller pieces of adhesive tape used to ensure the wrap is continuous around the top and bottom gasket sections having a top and bottom surface portion covered with the fabric that is either a prepreg or pre or post infused with adhesives.

FIG. 9 is a schematic top view of FIG. 6 (900) that illustrates an important embodiment of the present invention. The use of the toroidal wrapped fabric with seams in the form of a tape with seams (220) and two smaller pieces of adhesive tape (910, 920) is used to ensure the wrap is continuous around the top and bottom gasket sections. The gasket has a top and bottom surface portion covered with the fabric that is either a prepreg or pre or post infused with adhesives.

Figure 10:
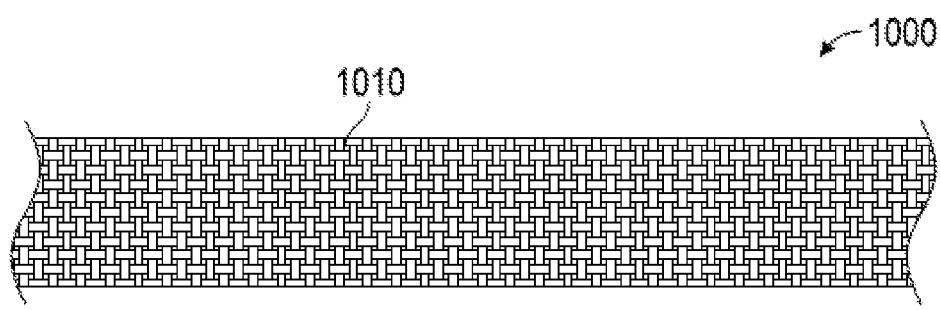
FIG. 10 is schematic top view of an example of one of the embodiments of the present invention illustrating a patterned fabric such as is used in FIG. 9.

FIG. 10 is simply a schematic top view of one example of one of the embodiments of the present invention illustrating a patterned fabric such as is used in FIG. 9. In this case the pattern is that of a Kevlar® (polyamide) tape which has been subsequently filled or infused with epoxy that has been filled with ceramic.

Figure 11:
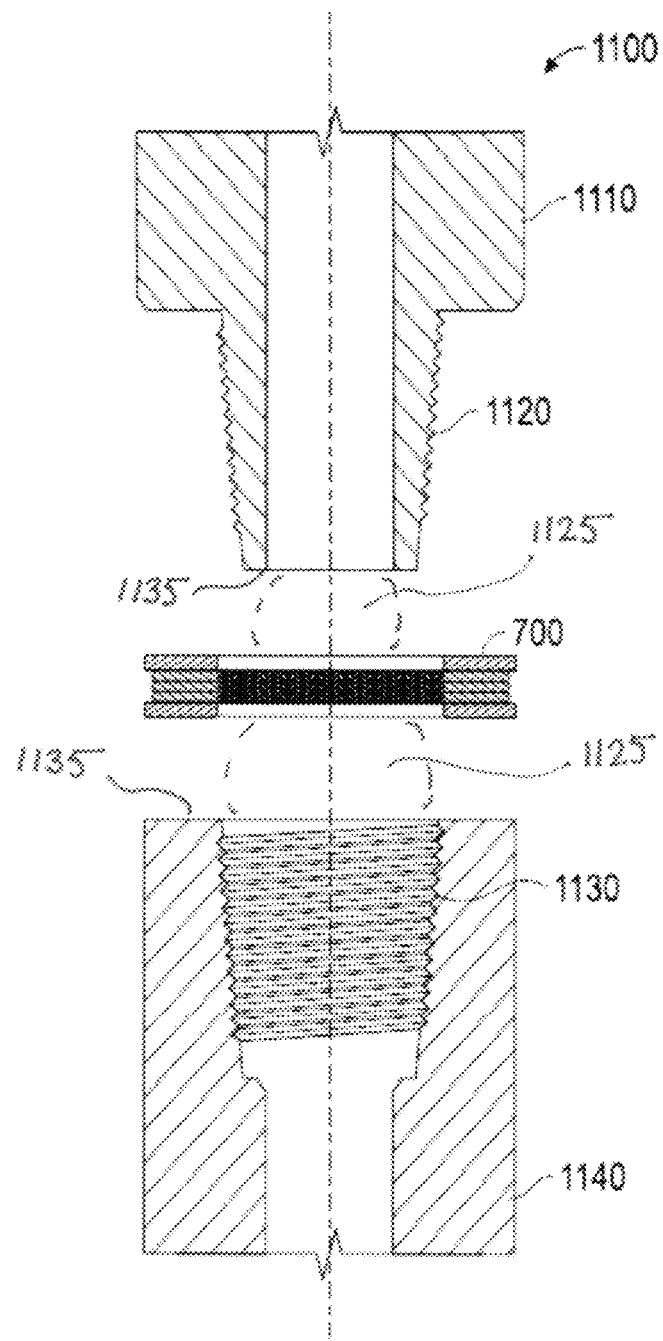
FIG. 11 is schematic cut-away side view of an example of using one of the ringed gaskets of the present invention (as shown for example in FIG. 3) in a gap subassembly.

FIG. 11 is a schematic cut-away side view of an example of using one of the ringed gaskets (700) of the present invention (as shown for example in FIG. 3) in a piping assembly including a gap subassembly (1100). The top bulk section of the body of the sub assembly (1110) includes a threaded female section (1120) that is distanced from the bulk section of the bottom of the subassembly (1140) having a threaded male section (1130) by a representation of the ringed gasket of the present invention (700). Insertion of the ringed gasket provides the many functions of the gasket as described herein including dampening the forces and ensuring non-conductivity associated with motion of the joint between the top (1110) and bottom (1140) sections of the subassembly. The threaded female section (1120) is half-mated to the threaded male section (1130) by the ringed gasket (700). The location of the half mate (1125) depicted via two dashed arcs above and below the ringed gasket (700). The sealing groove (1135) is present on the bottom surface of the threaded female section (1120) and top surface of the threaded male section (1130) by the ringed gasket (700).

Figure 12:
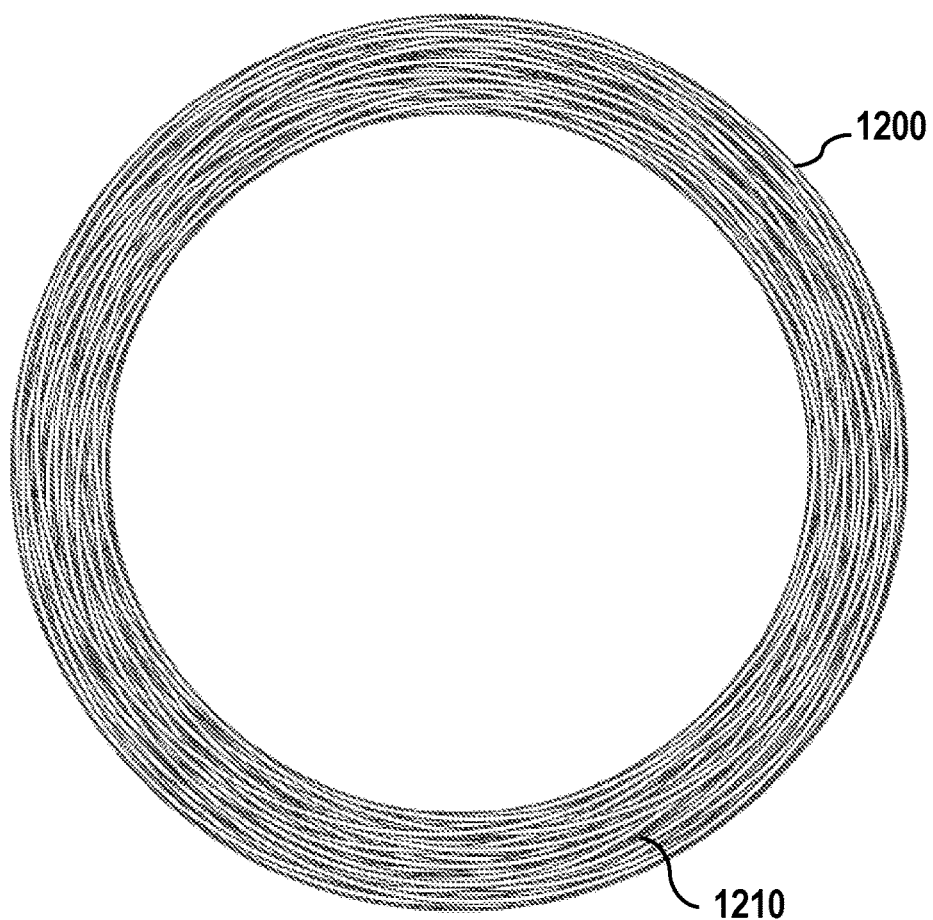
FIG. 12 is a schematic of a spun bonded by spin winding of a ringed gasket of the present invention illustrating spun wound and bonded fibers along the radial direction of the gasket.
Figure 12:
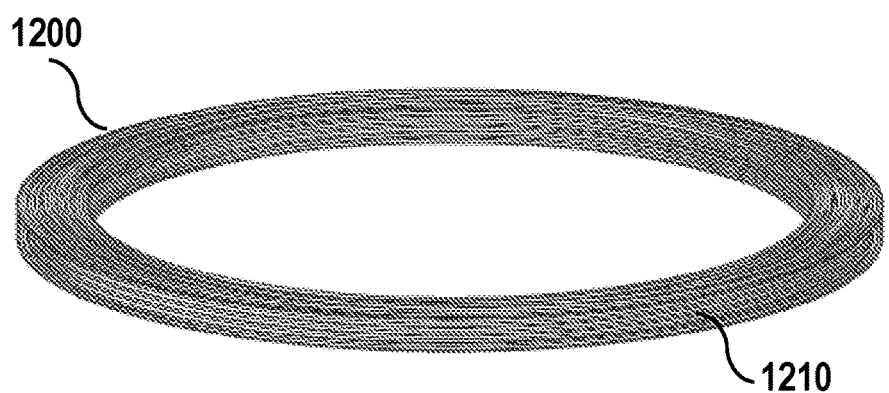

FIG. 12 is a schematic of a spun bonded by spin winding of a ringed gasket (1200) of the present invention illustrating spun wound and bonded fibers (1210) along the radial direction of the gasket. This gasket can be prepared by a number of methods obtained by wrapping the fibers along a mandrel, a spool, or other similar cylindrically shaped core that allows for ringed gaskets to be obtained from slicing or cutting the finished product. In this case the core would be covered with a set of treated and/or cured fibers/ wrapped around it. Another method would include one similar to that used for the manufacture of wet spun bonded pipes or spun bonded non-wovens. Curing the liquid adhesive is required in all cases.

It is instructive to also describe one of many methods of using the non-conductive ringed sealing gasket for mating one or more pipe joints along one or more piping assemblies as follows;

at least two mutually joined ring-shaped bodies, the bodies each with a top surface portion, a top gasket section bonded with, adhered to, or part of the top surface portion, a bottom surface portion, and a bottom gasket section bonded with, adhered to, or part of the bottom surface portion wherein the bottom surface portion of one of the bodies is being mated to a top surface portion of another of the bodies forming multi-layers so that the at least two mutually joined ringed-shaped bodies in combination comprise a sealing ring. This is accomplished when the top and bottom gasket section along with the top and bottom surface portion have equal dimensioned outer diameters with a total thickness no greater than the diameter of the piping assembly in each pipe-joint half mated by the gasket. It is also possible to accomplish this with a design as shown in FIG. 3. The top and bottom gasket section of the ringed sealing gasket can be comprised of a metal or a non-metal such as a ceramic or ceramer and the top and bottom gasket section is separated by an inner portion that is comprised of one or more materials that can be either conductive or non-conductive. These materials being in combination with a top and bottom surface of the inner portion remain ductile but do not flow in order to avoid failure during moving of the piping assembly causing dynamic motion and forces associated with the motion of one or more pipe joints.

Here failure is defined as when any two sections of the piping assembly become unified sufficiently to cause an electrically conductive circuit to exist through the ringed gasket. Normally this failure can be determined by measuring conductivity from one side of the piping assembly to the other side or from one side of the gasket to the other side using an ohm meter. If resistivity is measured to be equal to or greater than 10,000 ohms, the gasket no longer is providing insulative qualities needed for a typical gap sub.

Adapting the sealing ring for pressure-tight joining of pipe elements that exhibit "full metal ductility", is a critical design parameter of the gasket. "Full metal ductility" is therefore achieved by using metal rings either for the top and/or bottom gasket sections of the gasket and/or within the inner portion of the gasket. Using ceramics, for example, has been shown to be useful but inferior to the present design, as ceramics have immense compressive strength but lack ductility. In this aspect of the invention it was known that the use of ceramers (ceramics with reduced compressive strength but improved ductility) would be useful and necessary for the application requirements. It was also determined that a non-conductive metal would be the ideal material property for the needed gasket, but no known non-conductive metal exists. The gasket will only tolerate and withstand excessive compressive, tensile, shear and/or torsional forces greater than or equal to that of dynamic compressive, tensile, shear and/or torsional strength of the one or more pipe joints by placing and attaching the ringed sealing gasket described in detail above. The design and material combinations with layers described herewithin allow for ensuring one or more pipe joints and mating each of the pipe-joint halves into a single joint thereby sealing the joint. The gasket can therefore allow the joint to operate properly, in for example, a gap subassembly used for downhole applications.

It is further useful and instructive to describe one of several possible methods of making the layered non-conductive ringed sealing gasket for mating one or more pipe joints along a piping assembly is as follows:

providing a mold cavity and coating the cavity with a mold release substance;

placing a first ring at the bottom of the cavity;

placing at least one or a set of second ring(s) on top of the first ring thereby adding one or more layers that are wrapped with fabrics made from fibers or films infused with adhesives and using vacuum for removing any air or voids existing within the polyamide residing on top of the first ring at the bottom of the cavity;

then placing at least a third ring on top of the one or second set of ring(s) thereby forming sandwiched layers of the layered non-conductive ringed sealing gasket;

strategically placing a cover onto the mold cavity with bolts threaded there through, thereby securing and pressurizing by tightening both the mold cavity and the layers of the layered ringed sealing gasket so that the layers of the sealing gasket are compressed into a single ringed entity;

applying a force for further pressurizing by further tightening and squeezing the cover onto the single ringed entity and the mold cavity and;

curing the single ringed entity, by heating the mold cavity under pressure using a variable temperature schedule for the heating;

cooling the mold cavity and its contents, removing the cover, removing the single ringed entity from the mold cavity,
and;

trimming any remaining flashing from the single ringed entity thereby completing the layered non-conductive ringed sealing gasket.

The adhesives can be a filled epoxide which are filled with at least one of the group consisting of: fibers, films, or particles of; ceramics, ceramers, tungsten carbide, silicon carbide, silica including silane bonding agents, silicone polymers, E-glass, polybenzimidizoles, polyetheretherketones, polysulfones, polyetherimides, and fluoropolymers and wherein fabric is manufactured from the group consisting of fibers or films of polyamides, polyimides, polyamideimides, polybenzimidizoles, polyesters, fiberglass and biopolymers wherein adhesion is improved between the fabric and a metal ring surface using silane bonding agents.

The method includes a first ring that is a metal or non-metal ring as well as at least one or a set of second ring(s) that are metal or non-metal ring(s). In addition, the third ring is either a metal or non-metal ring. Also, the first ring and/or the third ring can be a ceramic ring and /or the first and/or third ring can be an inorganic and/or organic composite ring.

In constructing the gasket, applying a vacuum to the mold cavity prior to molding further will force any remaining air out of the cavity, thus avoiding improper fill and voids and reducing flashing.

There is a desired temperature schedule for curing the single ringed entity (gasket) in a programmable oven. The schedule should be heating from an ambient temperature to 90 C for 2 hours, followed by heating to 150 C for 2 hours followed by heating to 180 C for 2 hours followed by cooling back to ambient temperature. Pressurizing by tightening both the mold cavity and the layers of the layered ringed sealing gasket so that the layers of the sealing gasket are compressed into a single ringed entity is normally accomplished in a range of between 500 and 2000 psig and preferably is accomplished at 1000 psig.

It is normally desirable to machine the components of the sealing gasket without any imperfections, however, these imperfections will occur in almost all cases. Surface abnormalities—specifically rougher surfaces, may in this case be beneficial because they provide better bonding sites and surface energy matching between dissimilar materials than otherwise would occur. In some cases, to prevent delamination during static and/or dynamic loading that causes stresses, the use of silane bonding agents will assist greatly regarding increasing bond strengths between the layers. There may also be situations in which the interface between the metals and the epoxides (or other adhesives) require little or no filler to ensure the layered ringed shaped gasket layers provide the maximum flexural modulus. In this instance, delamination of the layers should decrease versus that of stiffer dissimilar material bonding, which has recently been determined during testing. In this case, also, the pressure used to fabricate the ringed sealing gasket, would be minimized and compression may only require a plate or set of plates be used to squeeze the components of the sealing gasket together within the range of ambient to 50 psi. One such set of rings were fabricated according to the example below at a pressure of 10 psi.

The one or more first, second metal ring(s) (could be a set of rings as described above) or third rings can be surface treated with an oxygen treating process (such as plasma etching using reactive oxidation) thereby forming non-conductive metal oxides. Additionally, the one or more second ring(s) can be wrapped with polyamide tape in either a toroidal or a cigarette taped pattern or are covered and not wrapped with a woven or non-woven polyamide cloth.

Additionally, it is possible to wrap the ringed gaskets, as shown in FIG. 12, such that the fibers (and/or filaments) are radially wrapped in a spun wound fashion along the circumferential portion of both the top and bottom surfaces of the ringed gaskets. One method for obtaining ringed gaskets of this configuration is by winding the fibers and/or filaments onto a mandrel and then treating and/or curing the fibers so that become permanently bonded to the mandrel. The mandrel can then be sectioned so that several ringed gaskets can be obtained by such sectioning.

One skilled in the art of molding or otherwise prepeg preparation of parts will recognize that the methods described above are not all encompassing in that the methods could be revised to include performing injection molding, reactive injection molding, compression molding, possibly extrusion of hollow tubing and/or piping, and spun winding, which would then allow for fabrication of the ringed gaskets by cutting the appropriate sections with desired thicknesses.

EXAMPLE

More specifically, for downhole applications using a gap subassembly, one example of testing the ringed gasket is as follows (comparisons with simple ceramic rings);

A kerros ring compression test rig was fabricated so that the ringed sealing gasket could be placed between an "API" threaded joint connection. Specifically, there is both a male (pin) thread section and a female (box) section between which the ringed gasket was placed. This rig was fabricated with a single shoulder to simulate how the ringed gasket would operate in a downhole gap subassembly—both during static and dynamic loading environments.

In each case, four (4) ringed sealing gaskets using different fabrication methods were placed in the rig with the results as shown below. The different fabrications of the single entity ringed gasket are given below in each table.

The results are separated into 4 tables (1A-D and 2A-D) regarding both static and dynamic loading testing performed for each of 4 separate ringed sealing gaskets. All four rings neither delaminated or otherwise failed to maintain their mechanical integrity. In addition during the static and dynamic loading the rings were not able to sustain an electrical circuit meaning that they each remained insulative during the static and dynamic loads that were applied in the compression rig as described above.

Tables 1A-D indicate the results of compression of the gasket between the threads indicating the compressive pressures (in psi) and the resulting gap changes in dimensions (inches) due to the compression.

Tables 2A-D indicate the results of torsional stress provided to the gasket between the threads indicating the torsional load (measured in ft-lbs) and the resulting gap changes in dimensions due to the torque.

Example 1

Static Compression Testing with Ringed Sealing Gaskets

Table 1A: Ring #1 of 4
Table 1B: Ring #2 of 4
Table 1C: Ring #3 of 4
Table 1D: Ring #4 of 4

TABLE 1A*

|  | PSI # | Gap-L | Gap-R |
| --- | --- | --- | --- |
| Test #1 | 0 | 0.529 | 0.529 |
|  | 1000 | 0.529 | 0.526 |
|  | 2000 | 0.528 | 0.524 |
|  | 3000 | 0.528 | 0.524 |
| Test #2 | 0 | 0.529 | 0.529 |
|  | 1000 | 0.525 | 0.525 |
|  | 2000 | 0.522 | 0.521 |
|  | 3000 | 0.521 | 0.522 |
|  |  |  | (0.524) |

*Ring 1 Specifications: 0.125" outer, 3x 0.062" inner, torroid wrap, 1350 Epoxy ceramic

TABLE 1B**

|  | PSI # | Gap-L | Gap-R |
| --- | --- | --- | --- |
| Test #1 | 0 | 0.466 | 0.467 |
|  | 1200 | 0.465 | 0.465 |
|  | 2000 | 0.465 | 0.465 |
|  | 3000 | 0.464 | 0.464 |
| Test #2 | 0 | 0.466 | 0.467 |
|  | 3000 | 0.465 | 0.465 |

**Ring 2 Specifications: 0.062" outer, 2x 0.125" inner, torroid wrap, 1350 ceramic

TABLE 1C***

|  | PSI # | Gap-L | Gap-R |
| --- | --- | --- | --- |
| Test #1 | 0 | 0.540 | 0.555 |
|  | 1000 | 0.534 | 0.544 |
|  | 2000 | 0.530 | 0.537 |
|  | 3000 | 0.528 | 0.534 |
| Test #2 | 0 | 0.532 | 0.540 |
|  | 1000 | 0.530 | 0.536 |

TABLE 1C***-continued

|  | PSI # | Gap-L | Gap-R |
|---|---|---|---|
|  | 2000 | 0.529 | 0.534 |
|  | 3000 | 0.527 | 0.532 |
| Test #3 | 0 | 0.533 | 0.540 |
|  | 3000 | 0.527 | 0.532 |

***Ring 3 Specifications: 0.125" outer, 3x 0.062" inner, torroid wrap, 1350 ceramic, 20 Grit AL Oxide grit

TABLE 1D****

|  | PSI # | Gap-L | Gap-R |
|---|---|---|---|
| Test #1 | 0 | 0.471 | 0.555 |
|  | 1000 | 0.470 | 0.544 |
|  | 2000 | 0.470 | 0.537 |
|  | 3000 | 0.469 | 0.534 |
| Test #2 | 0 | 0.471 | 0.540 |
|  | 3000 | 0.468 | 0.532 |
| Test #3 | 0 |  |  |
|  | 3000 | 0.469 | 0.532 |
|  | 0 | 0.471 | 0.465 |

****Ring 4 Specifications: 0.125" outer, 2x 0.062" inner, torroid wrap, Ceramic epoxy Example 2

Dynamic Compression Testing with Ringed Sealing Gaskets

Table 2A: Ring #1 of 4  Table 2B: Ring #2 of 4
Table 2C Ring #3 of 4  Table 2D Ring #4 of 4

TABLE 2A†

| Torque (ft.lbs.) | Gap-L | Gap-R | Angular" |
|---|---|---|---|
| 350 | 0.480 | 0.493 | 0 |
| 5000 | 0.470 | 0.544 | 1⅛" |
| 10000 | 0.470 | 0.537 | 2⅝" |
| 15000 | 0.469 | 0.534 | 3⅛" |
| 20000 | 0.471 | 0.540 | 3¾" |
| 25000 | 0.468 | 0.532 | 4½" |

†#1: 0.460" thickness, 0.062" outer, 0.125" inner, Test #1 Sample #2 - 20K to break apart

TABLE 2B††

| Torque (ft.lbs.) | Gap-L | Gap-R | Angular" |
|---|---|---|---|
| 500 | 0.540 | 0.540 | 0 |
| 5000 | 0.536 | 0.531 | 1⅜" |
| 10000 | 0.527 | 0.520 | 2¼" |
| 15000 | 0.523 | 0.518 | 3" |
| 20000 | 0.518 | 0.516 | 3¾" |
| 25000 | 0.511 | 0.508 | 4½" |

††Sample #1 test #2: 0.534" thickness, 0.125" outer, 3x 0.062" inner, torroidal wrap, 1350 ceramic, 17K to break apart, 0.530" thickness after break out.

TABLE 2C†††

| Torque (ft.lbs.) | Gap-L | Gap-R | Angular" |
|---|---|---|---|
| 500 | 0.555 | 0.539 | 0 |
| 5000 | 0.534 | 0.530 | 1¾" |
| 10000 | 0.523 | 0.515 | 3" |
| 15000 | 0.508 | 0.502 | 4½" |
| 20000 | 0.485 | 490.000 | 6⅛" |
| 25000 | 0.470 | 0.485 | 7½" |

†††0.125" outer, 2x 0.062" inner, torroidal wrap, 120 Grit AL oxide, ceramic epoxy, 0.536/0.545" before torque, 0.512/0.510" after torque test

TABLE 2D††††

| Torque (ft.lbs.) | Gap-L | Gap-R | Angular" |
|---|---|---|---|
| 500 | 0.489 | 0.486 | 0 |
| 5000 | 0.472 | 0.471 | 1¾" |
| 10000 | 0.468 | 0.467 | 2⅜" |
| 15000 | 0.465 | 0.465 | 2⅞" |
| 20000 | 0.453 | 0.454 | 4" |
| 25000 | 0.443 | 0.445 | 5" |

††††0.125" outer, 2x 0.062" inner, torroidal wrap, ceramic epoxy, 0.471" before torque, 0.445" after torque test, The preceding description of specific embodiments of the present invention is not intended to be a complete list of every possible embodiment of the invention. Persons skilled in this field will recognize that modifications can be made to the specific embodiments described here that would be within the scope of the present invention.

We claim:

1. A non-conductive multi-layered ringed sealing gasket for mating one or more pipe joints along one or more piping assemblies comprising:

at least two mutually joined ring-shaped bodies, said bodies each having a top surface portion, a top gasket section bonded with, adhered to, or part of said top surface portion, a bottom surface portion, and a bottom gasket section bonded with, adhered to, or part of said bottom surface portion wherein said bottom surface portion of one of said two mutually joined ring-shaped bodies is mated to a top surface portion of another of said bodies forming multi-layers of said non-conductive multi-layered ringed sealing gasket;

whereby;

said at least two mutually joined ringed-shaped bodies in combination comprise a ringed sealing gasket, so that said top gasket section and bottom gasket section along with said top surface portion and said bottom surface portion have the same outer diameters with a total thickness no greater than a diameter of said piping assembly in each pipe-joint that joins pipe elements via half mating with said gasket;

and wherein said top and bottom gasket section of said ringed sealing gasket is comprised of a metal and wherein said top gasket section and said bottom gasket section is separated by an inner portion of said ringed sealing gasket that is comprised of one or more thermally and or electrically non-conductive materials wherein said non-conductive materials are in combination with a top and bottom surface of said inner portion and are ductile during dynamic motion and forces associated with motion of said one or more pipe joints;

and wherein said non-conductive multilayered ringed sealing gasket is thus adapted for pressure-tight joining of pipe elements that withstand compressive, tensile, shear and/or torsional forces greater than or equal to that of compressive, tensile, shear and/or torsional strength that one or more pipe joints can withstand wherein at least one layer includes said inner portion of said ringed sealing gasket that includes continuous toroidal axially and radially wrapped fibers having voids filled with adhesives such that shear forces occurring during movement of said piping assemblies are distributed predominantly radially along an axial length of said fibers, thereby forcing said fibers to distribute load in a tensile direction along a length of said fibers which eliminates cracking of said gasket.

2. The gasket of claim 1, wherein at least one layer includes said inner portion that is wrapped in a toroidal pattern with a prepreg or fabric filled with said adhesives, wherein said adhesives are epoxies, and wherein said prepeg is manufactured from the group consisting of fibers or films of polyamides, polyimides, polyamideimides, polybenzimidizoles, polyesters, fiberglass and biopolymers.

3. The gasket of claim 2, wherein said epoxies are filled with at least one of the group consisting of: fibers, films, or particles of; ceramics, ceramers, tungsten carbide, silicon carbide, silica including silane bonding agents, silicone polymers, E-glass, polybenzimidizoles, polyetheretherketones, polysulfones, polyetherimides, and fluoropolymers.

4. The gasket of claims 3, wherein at least one layer includes said inner portion with a cigarette wrapped polyamide having voids filled with said filled epoxides.

5. The gasket of claim 2, wherein at least one layer exists within said inner portion that is covered but not wrapped around with a woven or non-woven polymeric cloth having voids either pre-filled or post-filled with said epoxides.

6. The gasket of claim 2, wherein at least one layer exists within said inner portion that is covered by filament wound polyamide fibers having voids either pre-filled or post-filled with said epoxides.

7. The gasket of claim 2, wherein said filament can also be spun wound and bonded onto a cylindrical shaped core that is cut into sections with a thickness corresponding to a width of said sections or prepared as spun bonded wet piping or spun bonded nonwovens wherein a thickness of said gasket is determined by one or more cuts of said sections.

8. The gasket of claim 1, wherein said polyamide is Kevlar®.

9. The gasket of claim 1, wherein said inner portion comprises a single conductive or non-conductive homogenous material layer.

10. The gasket of claim 1, wherein said inner portion comprises a single conductive or non-conductive non-homogenous material layer.

11. The gasket of claim 1, wherein said total thickness is no greater than the diameter of a sealing groove in each half pipe-joint creating a full joint when mated by said gasket, wherein said sealing groove is located between two sections of said piping assembly.

12. The gasket of claim 1, wherein said top and bottom gasket section and said inner portion of said gasket are comprised of one or more non-conductive organic or inorganic materials.

13. The gasket of claim 1, wherein said top and bottom gasket section is configured such that dimensions of at least said top and bottom surface portion of an outer portion of said gasket section are greater than that of said inner portion of said gasket.

14. The gasket of claim 1, wherein said top and bottom gasket section is beveled along at least one outer edge of said top and/or bottom gasket section.

15. The gasket of claim 1, wherein said top and bottom gasket section are compressed toward each other; both upon mating with and insertion within at least two sections of said piping assembly while said piping assembly is either at rest or in motion.

16. The gasket of claim 1, wherein said non-conductive materials are anodized metal oxide(s) formed from a metal or metal alloy, the anodization of which can be established by treating said top and bottom surface metal portion of said gasket.

17. The gasket of claim 1, wherein said anodized metal oxide(s) are formed by anodized spraying, plasma etching, and/or oxidation exposure techniques of top and bottom metal gasket sections.

18. The gasket of claim 12, wherein said non-conductive materials comprise one or more layers of a ceramic or an inorganic composite material that includes a ceramer.

19. The gasket of claim 1, wherein said inner portion is comprised of only insulated metal rings.

20. The gasket of claim 1, wherein said sealing ring with said top and bottom gasket section along with said top and bottom surface portion include at least one diameter having dimensions greater than said inner portion of said sealing ring.

21. A non-conductive multi-layered ringed sealing gasket for mating one or more pipe joints along one or more piping assemblies comprising:
at least two mutually joined ring-shaped bodies, said bodies each having a top surface portion, a top gasket section bonded with, adhered to, or part of said top surface portion, a bottom surface portion, and a bottom gasket section bonded with, adhered to, or part of said bottom surface portion wherein said bottom surface portion of one of said two mutually joined ring-shaped bodies is mated to a top surface portion of another of said bodies forming multi-layers of said non-conductive multi-layered ringed sealing gasket;
whereby;
said at least two mutually joined ringed-shaped bodies in combination comprise a ringed sealing gasket, so that said top gasket section and bottom gasket section along with said top surface portion and said bottom surface portion have the same outer diameters with a total thickness no greater than a diameter of said piping assembly in each pipe-joint that joins pipe elements via half mating with said gasket;
and wherein said top and bottom gasket section of said ringed sealing gasket include a non-metal such as a ceramic or ceramer top and bottom section wherein said top gasket section and said bottom gasket section is separated by an inner portion of said ringed sealing gasket that is comprised of one or more thermally and or electrically non-conductive materials wherein said non-conductive materials are in combination with a top and bottom surface of said inner portion and are ductile during dynamic motion and forces associated with motion of said one or more pipe joints;
and wherein said non-conductive multilayered ringed sealing gasket is thus adapted for pressure-tight joining of pipe elements that withstand compressive, tensile, shear and/or torsional forces greater than or equal to that of compressive, tensile, shear and/or torsional strength that one or more pipe joints can withstand wherein at least one layer includes said inner portion of said ringed sealing gasket that includes continuous toroidal axially and radially wrapped fibers having voids filled with adhesives such that shear forces occurring during movement of said piping assemblies are distributed predominantly radially along an axial length of said fibers, thereby forcing said fibers to distribute load in a tensile direction along a length of said fibers which eliminates cracking of said gasket.

22. The gasket of claim 21, wherein at least one layer includes said inner portion that is wrapped in a toroidal pattern with a prepreg filled with said adhesives, wherein said adhesives are epoxides, and wherein said prepeg or fabric is manufactured from the group consisting of fibers or films of polyamides, polyimides, polyamideimides, polybenzimidizoles, polyesters, fiberglass and biopolymers.

23. The gasket of claim 21, wherein said epoxides are filled with at least one of the group consisting of: fibers, films, or particles of; ceramics, ceramers, tungsten carbide, silicon carbide, silica including silane bonding agents, silicone polymers, E-glass, polybenzimidizoles, polyetheretherketones, polysulfones, polyetherimides, and fluoropolymers.

24. The gasket of claim 23, wherein at least one layer includes said inner portion with a cigarette wrapped polyamide having voids filled with said filled epoxides.

25. The gasket of claim 24, wherein at least one layer exists within said inner portion that is covered but not wrapped around with a woven or non-woven polyamide cloth having voids either pre-filled or post-filled with said epoxides.

26. The gasket of claim 21, wherein at least one layer exists within said inner portion that is covered by filament wound polyamide fibers having voids either pre-filled or post-filled with said epoxides.

27. The gasket of claim 26, wherein said filament can also be spun wound and bonded onto a cylindrical shaped core that is cut into sections with a thickness corresponding to a width of said sections or prepared as spun bonded wet piping or spun bonded nonwovens wherein a thickness of said gasket is determined by one or more cuts of said sections.

28. The gasket of claim 21, wherein said polyamide is Kevlar®.

29. The gasket of claim 21, wherein said inner portion comprises a single conductive or non-conductive homogenous material layer.

30. The gasket of claim 21, wherein said inner portion comprises a single conductive or non-conductive non-homogenous material layer.

31. The gasket of claim 21, wherein said total thickness is no greater than the diameter of a sealing groove in each half pipe-joint creating a full joint when mated by said gasket, wherein said sealing groove is located between two sections of said piping assembly.

32. The gasket of claim 21, wherein said top and bottom gasket section and said inner portion of said gasket are comprised of one or more non-conductive organic or inorganic materials.

33. The gasket of claim 21, wherein said top and bottom gasket section is configured such that dimensions of at least said top and bottom surface portion of an outer portion of said gasket section are greater than that of said inner portion of said gasket.

34. The gasket of claim 21, wherein said top and bottom gasket section is beveled along at least one outer edge of said top and/or bottom gasket section.

35. The gasket of claim 21, wherein said top and bottom gasket section are compressed toward each other; both upon mating with and insertion within at least two sections of said piping assembly while said piping assembly is either at rest or in motion.

36. The gasket of claim 21, wherein said non-conductive materials are anodized metal oxide(s) formed from a metal or metal alloy, the anodization of which can be established by treating said top and bottom surface metal portion of said gasket.

37. The gasket of claim 21, wherein said anodized metal oxide(s) are formed by anodized spraying, plasma etching, and/or oxidation exposure techniques of top and bottom metal gasket sections.

38. The gasket of claim 37, wherein said non-conductive materials comprise one or more layers of a ceramic or an inorganic composite material such as a ceramer.

39. The gasket of claim 21, wherein said inner portion is comprised of only insulated metal rings.

40. The gasket of claim 21, wherein said sealing ring with said top and bottom gasket section along with said top and bottom surface portion include at least one diameter having dimensions greater than said inner portion of said sealing ring.

41. A non-conductive multi-layered ringed sealing gasket for mating one or more pipe joints along one or more piping assemblies comprising:
at least two mutually joined ring-shaped bodies, said bodies each having a top surface portion, a top gasket section bonded with, adhered to, or part of said top surface portion, a bottom surface portion, and a bottom gasket section bonded with, adhered to, or part of said bottom surface portion wherein said bottom surface portion of one of said two mutually joined ring-shaped bodies is mated to a top surface portion of another of said bodies forming multi-layers of said non-conductive multi-layered ringed sealing gasket;
whereby;
said at least two mutually joined ringed-shaped bodies in combination comprise a ringed sealing gasket, so that said top gasket section and bottom gasket section along with said top surface portion and said bottom surface portion have the same outer diameters with a total thickness no greater than a diameter of said piping assembly in each pipe-joint that joins pipe elements via half mating with said gasket;
and wherein said ringed sealing gasket is adapted for pressure-tight joining of pipe elements and that of compressive, tensile, shear and/or torsional strength that one or more pipe joints can withstand wherein at least one layer includes said inner portion of said ringed sealing gasket that includes continuous toroidal axially and radially wrapped fibers having voids filled with adhesives such that shear forces occurring during movement of said piping assemblies are distributed predominantly radially along an axial length of said fibers, thereby forcing said fibers to distribute load in a tensile direction along a length of said fibers which eliminates cracking of said gasket.

42. The gasket of claim 41, wherein at least one layer includes said inner portion that is wrapped in a toroidal pattern with a prepreg filled with said adhesives, wherein said adhesives are epoxides, and wherein said prepeg or fabric is manufactured from the group consisting of fibers or films of polyamides, polyimides, polyamideimides, polybenzimidizoles, polyesters, fiberglass and biopolymers.

43. The gasket of claim 42, wherein said epoxides are filled with at least one of the group consisting of: fibers, films, or particles of; ceramics, ceramers, tungsten carbide, silicon carbide, silica including silane bonding agents, silicone polymers, E-glass, polybenzimidizoles, polyetheretherketones, polysulfones, polyetherimides, and fluoropolymers.

44. The gasket of claim 42, wherein at least one layer includes said inner portion with a cigarette wrapped polyamide having voids filled with said filled epoxides.

45. The gasket of claim 42, wherein at least one layer exists within said inner portion that is covered but not wrapped around with a woven or non-woven polyamide cloth having voids either pre-filled or post-filled with said epoxides.

46. The gasket of claim 45, wherein at least one layer exists within said inner portion that is covered by filament wound polyamide fibers having voids either pre-filled or post-filled with said epoxides.

47. The gasket of claim 41, wherein said filament can also be spun wound and bonded onto a cylindrical shaped core that is cut into sections with a thickness corresponding to a width of said sections or prepared as spun bonded wet piping or spun bonded nonwovens wherein a thickness of said gasket is determined by one or more cuts of said sections.

48. The gasket of claim 41, wherein said polyamide is Kevlar®.

49. The gasket of claim 41, wherein said inner portion comprises a single conductive or non-conductive homogenous material layer.

50. The gasket of claim 41, wherein said inner portion comprises a single conductive or non-conductive non-homogenous material layer.

51. The gasket of claim 41, wherein said total thickness is no greater than the diameter of a sealing groove in each half pipe-joint creating a full joint when mated by said gasket, wherein said sealing groove is located between two sections of said piping assembly.

52. The gasket of claim 41, wherein said top and bottom gasket section and said inner portion of said gasket are comprised of one or more non-conductive organic or inorganic materials.

53. The gasket of claim 41, wherein said top and bottom gasket section is configured such that dimensions of at least said top and bottom surface portion of an outer portion of said gasket section are greater than that of said inner portion of said gasket.

54. The gasket of claim 41, wherein said top and bottom gasket section is beveled along at least one outer edge of said top and/or bottom gasket section.

55. The gasket of claim 41, wherein said top and bottom gasket section are compressed toward each other; both upon mating with and insertion within at least two sections of said piping assembly while said piping assembly is either at rest or in motion.

56. The gasket of claim 41, wherein said non-conductive materials are anodized metal oxide(s) formed from a metal or metal alloy, the anodization of which can be established by treating said top and bottom surface metal portion of said gasket.

57. The gasket of claim 41, wherein said anodized metal oxide(s) are formed by anodized spraying, plasma etching, and/or oxidation exposure techniques of top and bottom metal gasket sections.

58. The gasket of claim 48, wherein said non-conductive materials comprise one or more layers of a ceramic or an inorganic composite material that includes a ceramer.

59. The gasket of claim 41, wherein said inner portion is comprised of only insulated metal rings.

60. The gasket of claim 41, wherein said sealing ring with said top and bottom gasket section along with said top and bottom surface portion include at least one diameter having dimensions greater than said inner portion of said sealing ring.

* * * * *